United States Patent [19]

Milne, III et al.

[11] Patent Number: 5,692,771

[45] Date of Patent: Dec. 2, 1997

[54] VEHICLE OCCUPANT PROTECTION APPARATUS

[75] Inventors: Kenneth T. Milne, III; Robyn Bryant, both of Gilbert, Ariz.

[73] Assignee: TRW Inc., Lyndhurst, Ohio

[21] Appl. No.: 614,089

[22] Filed: Mar. 12, 1996

[51] Int. Cl.⁶ .................................................. B60R 21/16
[52] U.S. Cl. ................................ 280/728.2; 280/731
[58] Field of Search .......................... 280/728.2, 731, 280/732, 728.3

[56] References Cited

U.S. PATENT DOCUMENTS

| | | | |
|---|---|---|---|
| 4,148,503 | 4/1979 | Shiratori et al. | 280/731 |
| 4,941,678 | 7/1990 | Lauritzen et al. | 280/732 |
| 4,989,897 | 2/1991 | Takada | 280/728.3 |
| 5,011,181 | 4/1991 | Laucht et al. | 280/731 |
| 5,013,064 | 5/1991 | Miller et al. | 280/730.1 |
| 5,058,919 | 10/1991 | Paquette et al. | 280/732 |
| 5,176,400 | 1/1993 | McGuire et al. | 280/728.2 |
| 5,332,256 | 7/1994 | Lauritzen et al. | 280/728.2 |
| 5,348,340 | 9/1994 | Humphreys et al. | 280/728.2 |
| 5,409,256 | 4/1995 | Gordon et al. | 280/728.2 |
| 5,427,407 | 6/1995 | Yokote | 280/728.2 |
| 5,454,586 | 10/1995 | Rogerson | 280/728.2 |
| 5,470,101 | 11/1995 | Ennis | 280/728.2 |
| 5,518,266 | 5/1996 | O'Docherty et al. | 280/728.2 |

Primary Examiner—Kenneth R. Rice
Attorney, Agent, or Firm—Tarolli, Sundheim, Covell, Tummino & Szabo

[57] ABSTRACT

A vehicle occupant protection apparatus (10) includes a reaction plate (74), an inflator (12) supported on the reaction plate (74), and a cover (30). The cover (30) has at least one pivotal deployment door (34,36) extending over the inflator (12), and further has a pair of mounting flaps (50) overlying the reaction plate (74). A retainer (100) holds the mounting flaps (50) and the inflator (12) against the reaction plate (74). The mounting flaps (50) and the reaction plate (74) together define tongue-and-groove joints (144) for interlocking the mounting flaps (50) with the reaction plate (74) so as to block movement of the mounting flaps (50) across the reaction plate (74) when the inflator (12) is actuated.

3 Claims, 6 Drawing Sheets

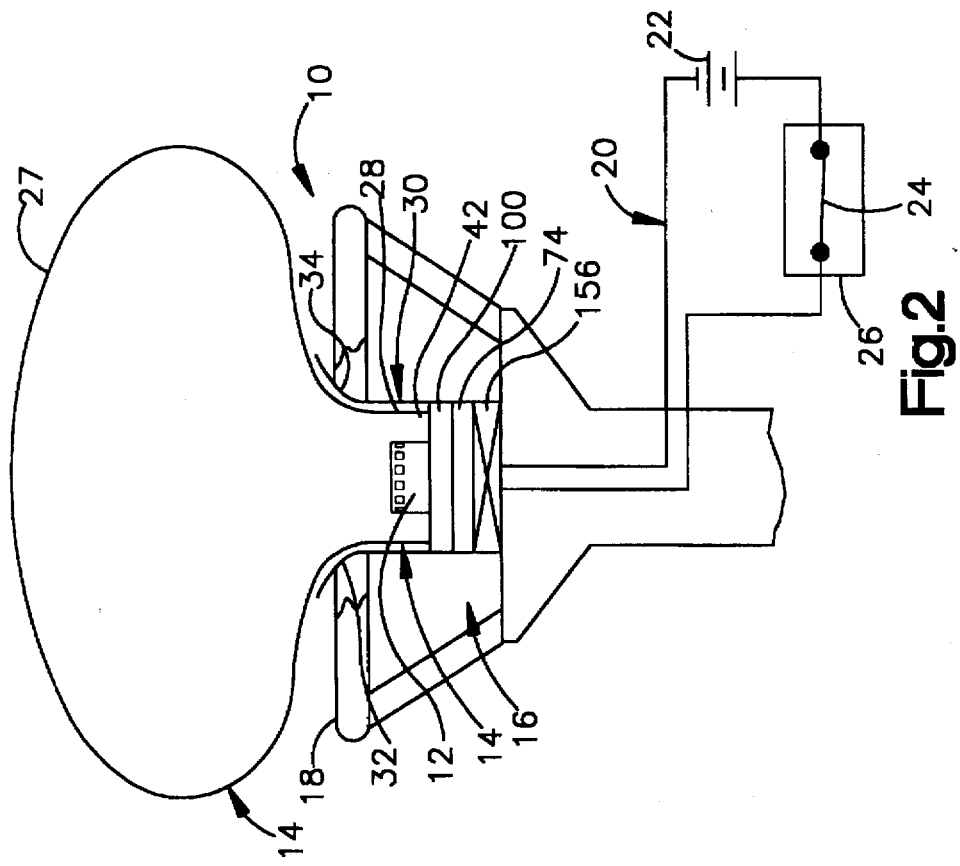
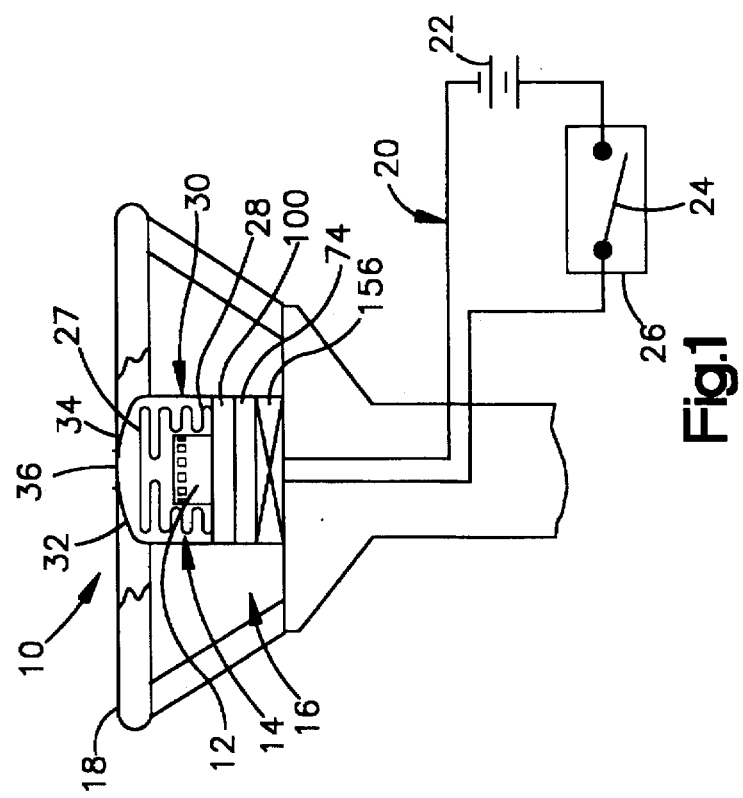

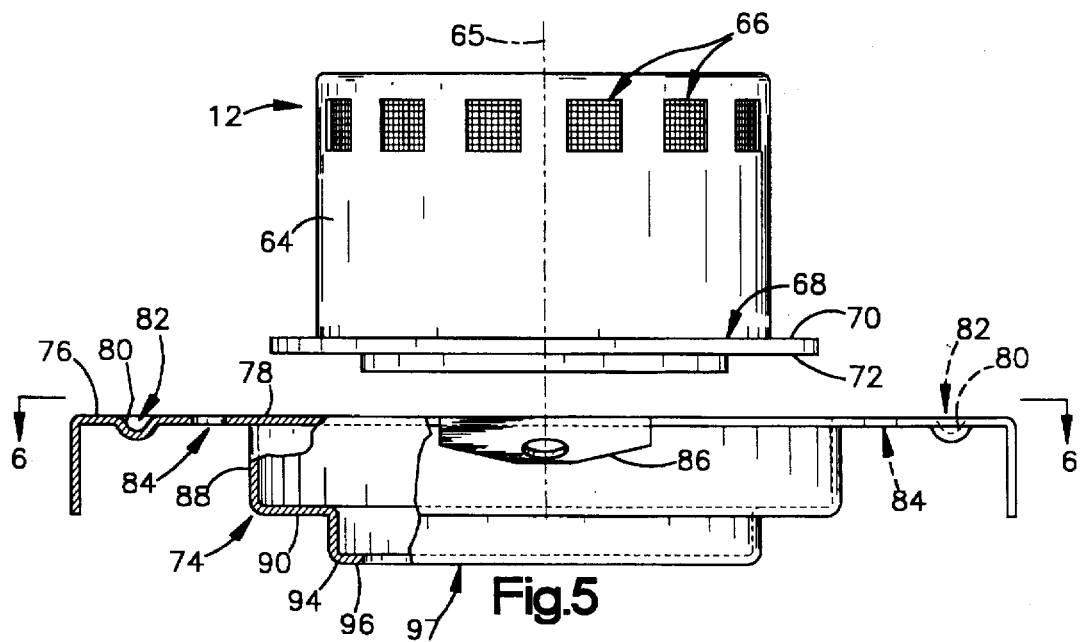
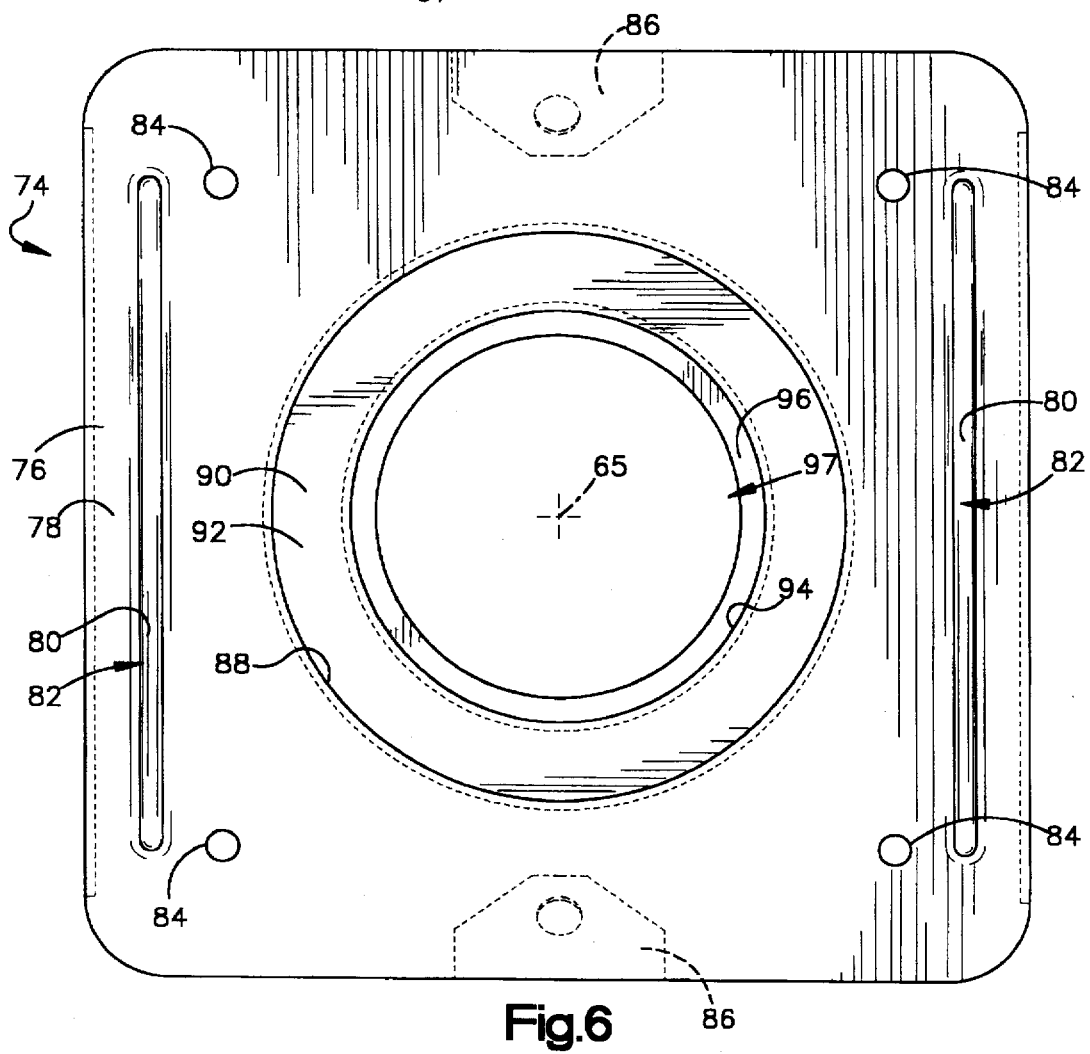

VEHICLE OCCUPANT PROTECTION APPARATUS

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is inflated upon the occurrence of a vehicle collision. The air bag is part of an apparatus which further includes a collision sensor and an inflator. The collision sensor senses vehicle conditions that indicate the occurrence of a collision. When the collision sensor senses a collision-indicating condition of at least a predetermined threshold level, the inflator is actuated. The inflator then emits inflation fluid which inflates the air bag into the vehicle occupant compartment to help protect an occupant of the vehicle from forcefully striking, or being struck by, parts of the vehicle as a result of the collision.

An air bag and an inflator are typically assembled together as parts of an air bag module which is separate from the collision sensor. The air bag module is located in the vehicle adjacent to the vehicle occupant compartment. For example, a passenger side air bag module is typically located in the vehicle instrument panel. A driver's side air bag module is typically located on the vehicle steering column. In addition to the air bag and the inflator, a driver's side air bag module typically includes a retainer and a cover. The retainer holds the air bag and the inflator together within the module. The cover conceals the other parts of the module from the vehicle occupant compartment, and includes at least one pivotal deployment door which extends directly over the air bag.

When the inflation fluid emitted from the inflator begins to inflate the air bag, it moves the air bag forcefully outward against the deployment door on the cover. The deployment door is ruptured by the force of the fluid pressure in the air bag, and is moved pivotally out of the path of the air bag as the inflation fluid continues to inflate the air bag outward into the vehicle occupant compartment.

SUMMARY OF THE INVENTION

In accordance with the present invention, a vehicle occupant protection apparatus comprises a reaction plate, an inflator, and a cover. The inflator is supported on the reaction plate. The cover has a pivotal deployment door extending over the inflator, and further has a mounting flap overlying the reaction plate. A retainer holds the mounting flap and the inflator against the reaction plate. The mounting flap and the reaction plate together comprise tongue-and-groove means for interlocking the mounting flap with the reaction plate so as to block movement of the mounting flap across the reaction plate when the inflator is actuated.

In a preferred embodiment of the present invention, the cover has a pair of generally parallel opposite side walls. The mounting flap is one of a pair of mounting flaps which project from the side walls in opposite directions over the reaction plate. Each mounting flap is interlocked with the reaction plate by a respective tongue-and-groove joint which is parallel to the corresponding side wall of the cover.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant protection apparatus comprising a first embodiment of the present invention;

FIG. 2 is a schematic view showing the apparatus of FIG. 1 in an actuated condition;

FIG. 5 is an exploded side view of parts of the apparatus of FIG. 1;

FIG. 6 is a view taken on line 6—6 of FIG. 5;

DESCRIPTION OF A PREFERRED EMBODIMENT

Figure 3:
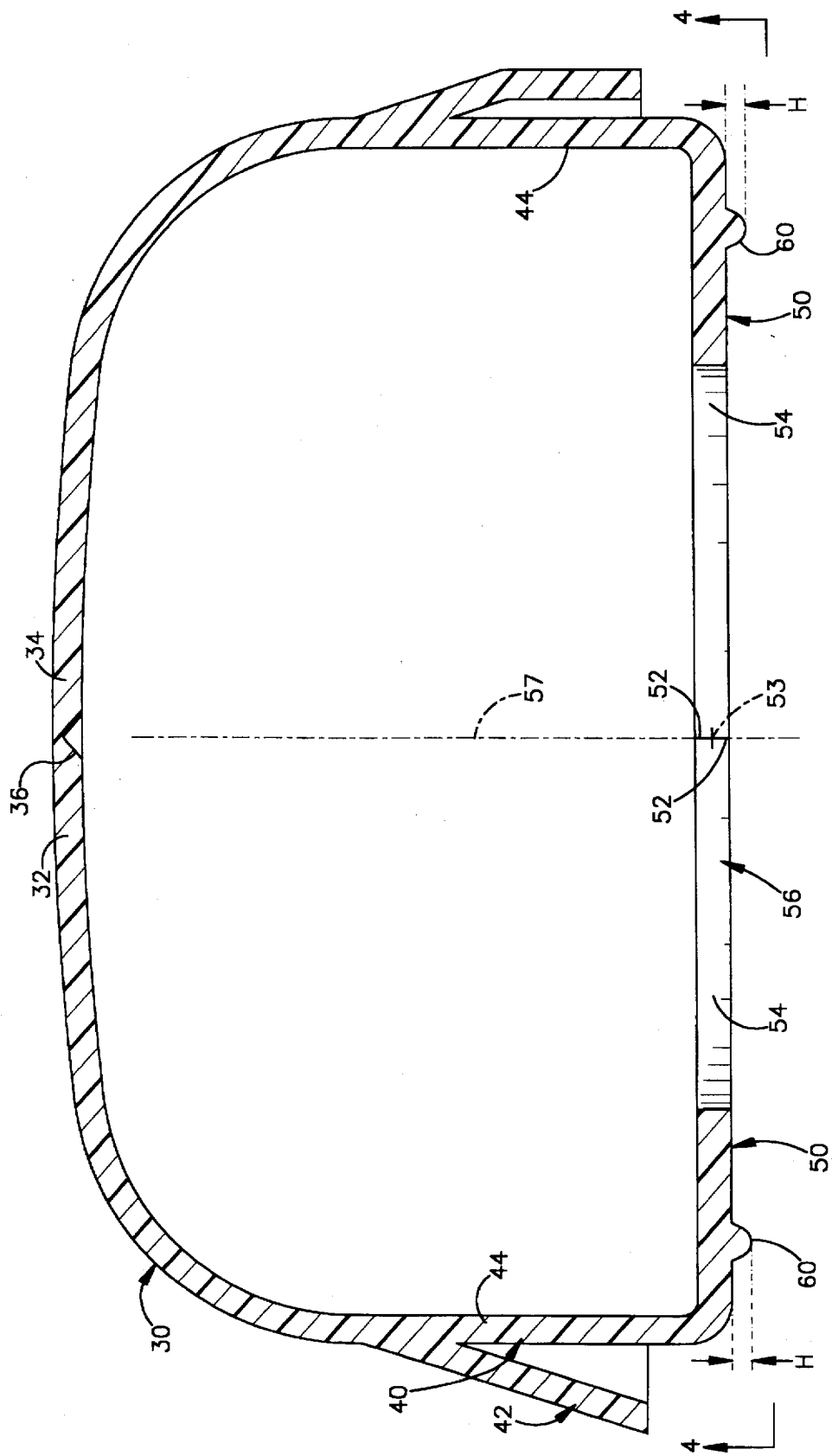
FIG. 3 is a side view of a part of the apparatus of FIG. 1.

A vehicle occupant protection apparatus 10 comprising a preferred embodiment of the present invention is shown schematically in FIGS. 1 and 2. The apparatus 10 includes an inflator 12 and a particular type of inflatable vehicle occupant protection device 14 which is commonly referred to as an air bag. The air bag 14 and the inflator 12 are parts of an air bag module 16 which is mounted on a vehicle steering wheel 18.

The air bag 14 is inflatable from a folded, uninflated condition, as shown in FIG. 1, to an unfolded, inflated condition, as shown in FIG. 2. When the air bag 14 is being inflated, it moves toward the driver of the vehicle. The air bag 14 then restrains movement of the driver toward the steering wheel 18 to help protect the driver from a forceful impact with the steering wheel 18 or other parts of the vehicle.

The inflator 12 is an electrically actuatable source of inflation fluid for inflating the air bag 14. In the preferred embodiment of the present invention, the inflator 12 contains an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid. Further, the inflator 12 could alternatively be mechanically actuated.

When the air bag module 16 is installed on the steering wheel 18, the inflator 12 is included in an electrical circuit 20 with a power source 22 and a normally open switch 24. The power source 22 is preferably the vehicle battery. The switch 24 is part of a sensor 26 which senses a condition indicating the occurrence of a vehicle collision. Such a condition may comprise, for example, sudden vehicle deceleration caused by a collision. If the collision-indicating condition is at or above a predetermined threshold level, it indicates the occurrence of a collision having at least a predetermined threshold level of severity. The threshold level of collision severity is a level at which inflation of the air bag 14 is desired to restrain movement of the driver of the vehicle, as described above. The switch 24 then closes, and electric current is directed through the inflator 12 to actuate the inflator 12. As a result, the inflator 12 rapidly emits a large volume of inflation gas which flows into the air bag 14 to inflate the air bag 14.

In the schematic views of FIGS. 1 and 2, air bag 14 is shown to have a major portion 27 and an inlet portion 28.

When the air bag 14 is being inflated from the condition of FIG. 1 to the condition of FIG. 2, the major portion 27 of the air bag 14 moves outward from the steering wheel 18 toward the driver of the vehicle. The inlet portion 28 of the air bag 14 is retained on the steering wheel 18 with the inflator 12.

Another part of the air bag module 16 is a cover 30 which encloses the air bag 14 and the inflator 12. The cover 30 is made of a pliable plastic material which may have any suitable composition known in the art. The cover 30 includes first and second deployment door panels 32 and 34 which extend over the air bag 14. The deployment door panels 32 and 34 are held in closed positions, as shown in FIG. 1, by a rupturable section 36 of the cover 30. As the inflation gas emitted from the inflator 12 begins to inflate the air bag 14, it moves the air bag 14 forcefully against the cover 30. The air bag 14 then ruptures the rupturable section 36 of the cover 30 and moves the deployment door panels 32 and 34 pivotally outward, as shown in FIG. 2. As the inflation gas continues to inflate the air bag 14, it moves the air bag 14 outward from the cover 30 past the deployment door panels 32 and 34. Although the cover 30 is shown as having two deployment door panels 32 and 34, it could alternatively have only a single deployment door panel or more than two deployment door panels.

Figure 4:
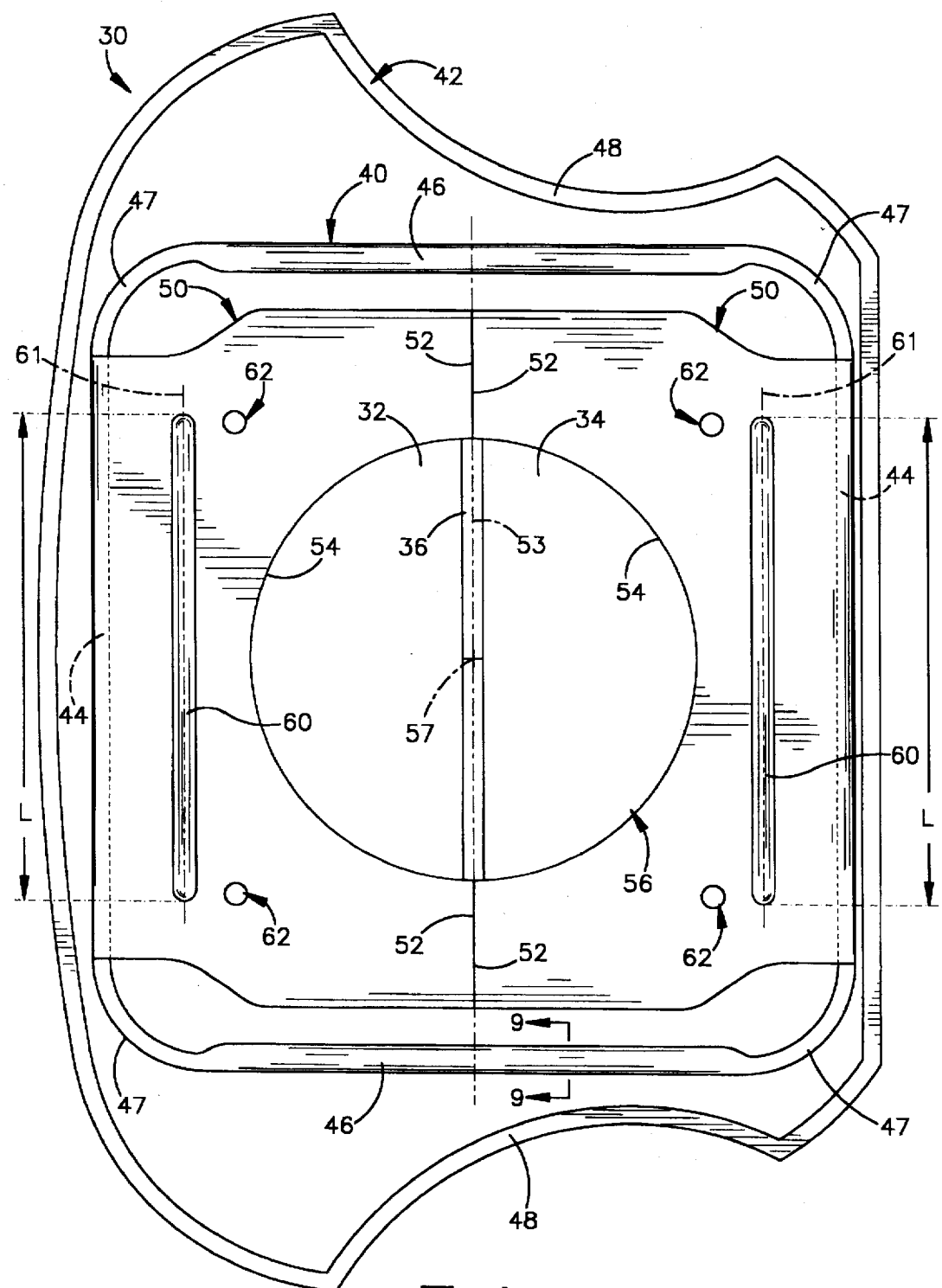
FIG. 4 is a view taken on line 4—4 of FIG. 3.

As shown in greater detail in FIGS. 3 and 4, the cover 30 has a base 40 and a skirt 42 projecting from the base 40. As best shown in FIG. 4, the base 40 has a generally rectangular peripheral shape defined by a first pair of opposed, generally parallel side walls 44, a second pair of opposed, generally parallel side walls 46, and four curved corner walls 47. The base 40 is thus shaped to extend closely around the folded air bag 14 (FIG. 1). The skirt 42 has an irregular peripheral shape defined in part by curved opposite side walls 48. As known in the art, the side walls 48 of the skirt 42 are shaped to mate with adjoining portions of another cover structure (not shown) on the spokes of the steering wheel 18.

A pair of mounting flaps 50 extend across the bottom of the base 40. Specifically, the mounting flaps 50 project inward across the base 40 in opposite directions from the first pair of opposed side walls 44. The mounting flaps 50 have linear inner edge surfaces 52 which adjoin each other along a centerline 53 of the base 40. A pair of opposed, semi-circular inner edge surfaces 54 of the mounting flaps 50 together define a circular opening 56 which is centered on a central axis 57 of the base 40.

Each mounting flap 50 has an elongated ridge or tongue 60 projecting downward from the lower side of the mounting flap 50. The tongues 60 have equal heights H (FIG. 3) extending downward in directions parallel to the central axis 57. The tongues 60 also have equal lengths L (FIG. 4) extending along respective longitudinal axes 61. The longitudinal axes 61 of the tongues 60 are perpendicular to, and spaced radially from, the central axis 57. Additionally, the longitudinal axes 61 are preferably parallel to each other, and are most preferably parallel to the opposed side walls 44 from which the mounting flaps 50 project inward across the base 40. Each mounting flap 50 further has a pair of apertures 62, with each aperture 62 being located at a corresponding corner of a rectangular array centered on the central axis 57.

As shown in greater detail in FIG. 5, the inflator 12 has a cylindrical housing 64 with a central axis 65. A circumferentially extending array of gas outlet openings 66 is located near one end of the housing 64. An annular mounting flange 68 projects radially outward at the other end of the housing 64. The flange 68 has upper and lower side surfaces 70 and 72 facing oppositely away from each other along the axis 65. The housing 64, including the mounting flange 68, is formed of a rigid metal material.

Also shown in FIG. 5 is a reaction plate 74 for supporting the inflator 12, the air bag 14, and the cover 30 in the air bag module 16 (FIGS. 1 and 2). In the preferred embodiment of the present invention, the reaction plate 74 is a unitary part comprising a single piece of stamped metal.

An upper portion 76 of the reaction plate 74 has a generally rectangular peripheral shape with rounded corners. The upper portion 76 of the reaction plate 74 thus has a peripheral shape that is complementary to the peripheral shape of the base 40 (FIG. 4) of the cover 30. A major upper side surface 78 of the upper portion 76 lies in a plane perpendicular to the axis 65 of the inflator housing 64. A pair of recessed upper side surfaces 80 define a corresponding pair of grooves 82 in the upper portion 76. The shapes and sizes of the grooves 82 are the same as the shapes and sizes of the tongues 60 (FIG. 3 and 4) on the mounting flaps 50. Moreover, the locations of the grooves 82 relative to the central axis 65 (FIGS. 5 and 6) are the same as the locations of the tongues 60 relative to the central axis 57 (FIGS. 3 and 4).

The upper portion 76 of the reaction plate 74 further has a rectangular array of apertures 84 corresponding to the rectangular array of apertures 62 (FIG. 4) in the mounting flaps 50 on the cover 30. A pair of opposed mounting tabs 86 project axially downward, and radially inward, from the upper portion 76 of the reaction plate 74.

A short cylindrical portion 88 of the reaction plate 74 is centered on the axis 65, and extends axially downward from the upper portion 76. An annular shoulder portion 90 of the reaction plate 74 extends radially inward from the cylindrical portion 88, and also is centered on the axis 65. A lower portion 94 of the reaction plate 74 extends axially downward from the shoulder portion 90. The lower portion 94 has an annular rim 96 extending a short distance radially inward toward the axis 65. The rim 96 defines a circular central opening 97 which provides access for connection of the inflator 12 in the electrical circuit 20 (FIGS. 1 and 2).

As shown schematically in FIGS. 1 and 2, the air bag module 16 further includes a retainer 100. As shown separately in FIG. 7, the retainer 100 is a unitary, stamped metal part with a planar frame 102 centered on an axis 103. Like the upper portion 76 (FIG. 6) of the reaction plate 74, the frame 102 has a rectangular peripheral shape with rounded corners. However, the frame 102 is substantially smaller, as measured between its opposite side edges, than the upper portion 76 of the reaction plate 74.

An upper flange 105 projects axially upward from the periphery of the frame 102. A lower flange 106 projects axially downward from the frame 102, and defines a circular central opening 108. Four threaded mounting studs 110 also project axially downward from the frame 102, with each stud 110 being located adjacent to a corresponding one of the four rounded corners of the frame 102. The mounting studs 110 are thus arranged in a rectangular array corresponding to the rectangular arrays of apertures 84 and 62 in the reaction plate 74 and the mounting flaps 50.

Figure 7:
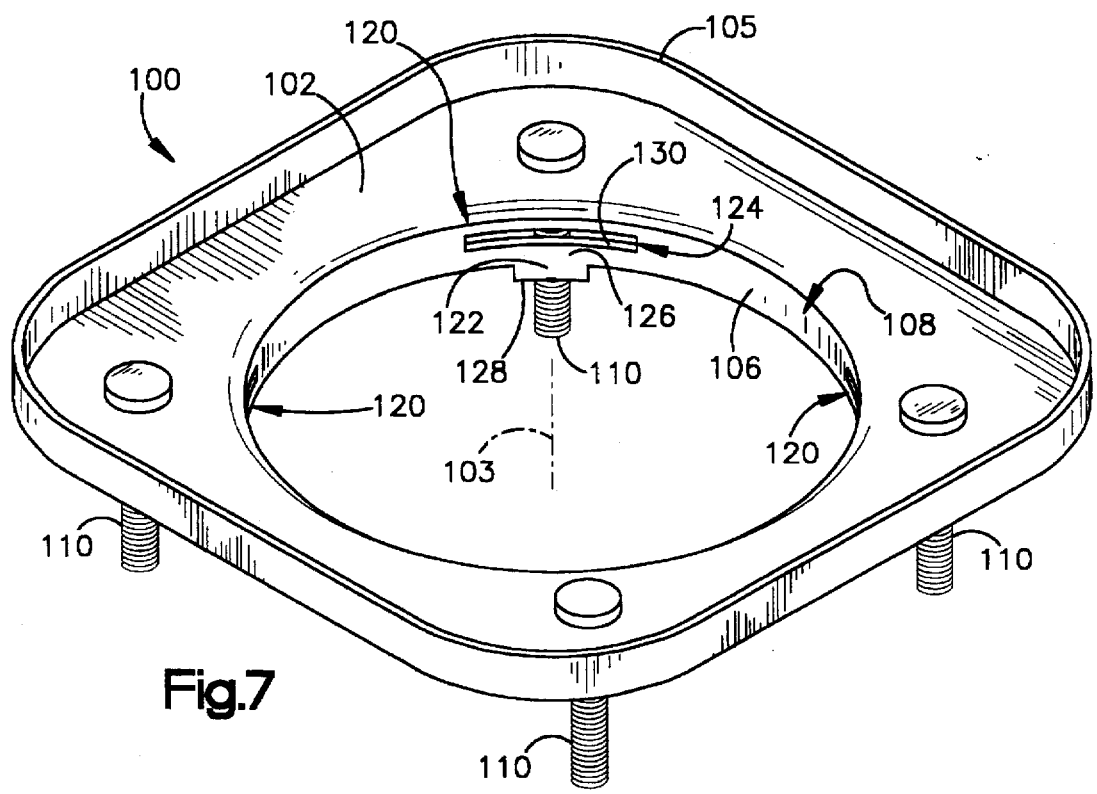
FIG. 7 is a perspective view of another part of the apparatus of FIG. 1.

The retainer 100 further has a plurality of spring structures 120, one of which is shown fully in FIG. 7. Preferably, the retainer 100 has four such spring structures 120, with each spring structure 120 being located in radial alignment with, i.e., circumferentially adjacent to, a corresponding one of the four mounting studs 110.

Each spring structure 120 includes a tab 122, a slot 124, and a spring arm 126. The tabs 122 project equal distances axially downward from the lower flange 106. Each tab 122 has a lower edge surface 128 in a plane perpendicular to the axis 103. The slots 124 are defined by corresponding inner edge surfaces 130 of the lower flange 106. Each slot 124 is elongated circumferentially about the axis 103, and extends longitudinally past the location of the corresponding tab 122. The spring arms 126 are circumferentially elongated portions of the lower flange 106 that are located axially between the slots 124 and the tabs 122.

Figure 8:
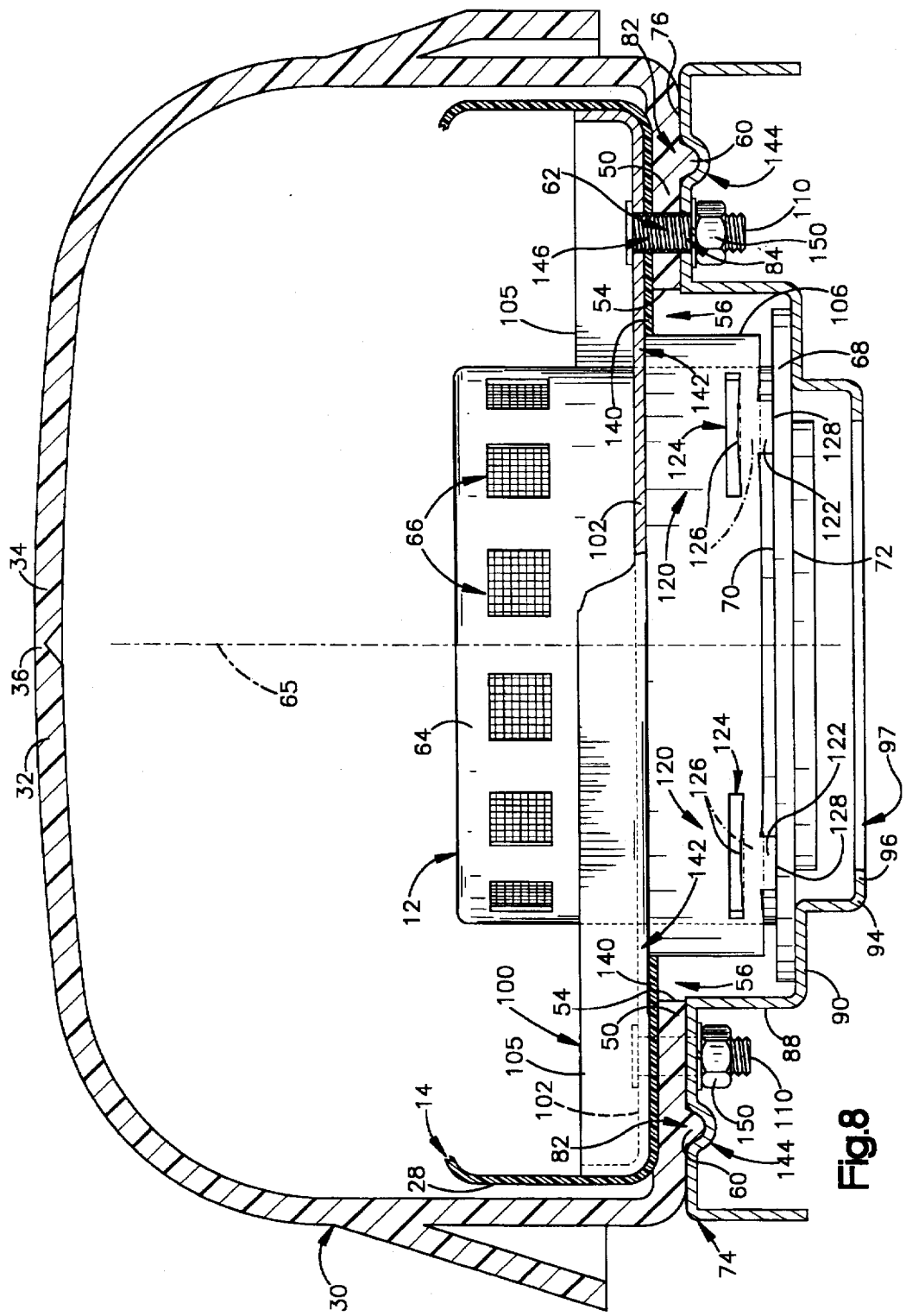
FIG. 8 is a partial side view of the apparatus of FIG. 1 showing several parts in an interconnected relationship.

The foregoing parts of the air bag module 16 are shown in their interconnected relationship in FIG. 8. In this arrangement, the mounting flange 68 on the inflator 12 lies upon the shoulder portion 90 of the reaction plate 74. The inlet portion 28 of the air bag 14 has an edge section 140 defining a circular inlet opening 142. The retainer 100 is received partially within the air bag 14 through the inlet opening 142, with the frame 102 and the upper flange 105 being located inside the air bag 14, and with the lower flange 106 projecting outward from the air bag 14 through the inlet opening 142. The tabs 122 at the bottom of the lower flange 106 stand on the mounting flange 68 on the inflator 12.

The mounting flaps 50 on the cover 30 overlie the upper portion 76 of the reaction plate 74. The edge section 140 of the air bag 14, in turn, overlies the mounting flaps 50. The mounting flaps 50 are thus located axially between the frame portion 102 of the retainer 100 and the upper portion 76 of the reaction plate 74. The semi-circular inner edge surfaces 54 of the mounting flaps 50 are spaced radially outward from the lower flange 106 on the retainer 100 such that the lower flange 106 and the inflator housing 64 both extend axially through the opening 56 defined by the mounting flaps 50. Importantly, the tongues 60 on the mounting flaps 50 are closely received within the grooves 82 in the upper portion 76 of the reaction plate 74. The tongues 60 and the grooves 82 thus establish a pair of interlocked tongue-and-groove joints 144 between the mounting flaps 50 and the reaction plate 74.

The mounting studs 110 on the retainer 100 project outward through apertures 146 in the edge section 140 of the air bag 14. The mounting studs 110 also extend through the apertures 62 in the mounting flaps 50, and further through the apertures 84 in the reaction plate 74. When a corresponding plurality of nuts 150 are tightened onto the mounting studs 110, the frame portion 102 of the retainer 100 is drawn axially downward toward the upper portion 76 of the reaction plate 74 by an axially directed clamping force. This causes the edge section 140 of the air bag 14, as well as the mounting flaps 50, to become compressively loaded and contracted axially between the retainer 100 and the reaction plate 74. In accordance with this feature of the present invention, the tongues 60 on the mounting flaps 50 are pressed tightly into the grooves 82 in the reaction plate 74.

When the nuts 150 are tightened onto the mounting studs 110, the resulting clamping force presses the tabs 122 on the retainer 100 forcefully downward against the mounting flange 68 so as to hold the mounting flange 68 firmly against the shoulder portion 90 of the reaction plate 74. The lower edge surfaces 128 of the tabs 122 are thus pressed against the upper side surface 70 of the mounting flange 68 forcefully enough to deflect the spring arms 126 upward across the slots 124 from the positions shown in dashed lines in FIG. 8 to the positions shown in solid lines in FIG. 8. In this manner, the spring structures 120 are contracted so as to permit the frame 102 to move axially toward the upper portion 76 of the reaction plate 74, as described above. The spring structures 120 remain stressed under the influence of the axially directed clamping force so as to exert a spring bias against the mounting flange 68 as an axially directed reaction force. The mounting tabs 86 on the reaction plate 74 are used with fasteners (not shown) to mount the interconnected parts of FIG. 8 on another part of the air bag module 16, such as a spring-loaded horn switch assembly 156 (FIGS. 1 and 2), in a known manner.

As described above, the air bag 14 moves forcefully against the cover 30 when it is being inflated from the condition of FIG. 1 toward the condition of FIG. 2. In addition to moving forcefully outward against the deployment door panels 32 and 34, the air bag 14 moves forcefully outward against the surrounding side walls 44 and 46 of the base 40. The air bag 14 thus applies inflation fluid pressure forces outwardly against the side walls 44 and 46 in directions perpendicular to the side walls 44 and 46. The forces that are thus applied to the first pair of side walls 44 are transmitted to the mounting flaps 50, and urge the mounting flaps 50 to move outward across the upper portion 76 of the reaction plate 74. Since the tongue-and-groove joints 144 are elongated in directions parallel to the first pair of side walls 44, those forces act transversely across the tongue-and-groove joints 144 along their entire lengths L. The tongue-and-groove joints 144 are thus oriented so as to offer a maximum amount of resistance to outward movement of the mounting flaps 50, and hence the adjacent side walls 44, under the influence of the inflating air bag 14.

Figure 9:
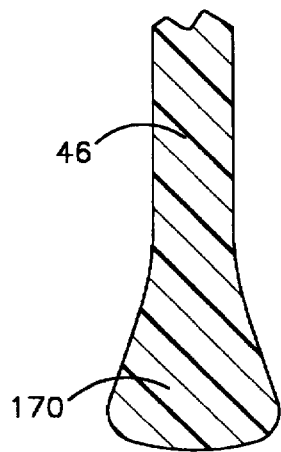
FIG. 9 is a view taken on line 9—9 of FIG. 4.

An additional feature of the present invention is shown partially in FIG. 9. In accordance with this feature of the invention, the second pair of side walls 46 have relatively thickened lower edge portions 170 extending along their lengths between the adjacent corner walls 47. In this manner, the side walls 46 are structurally reinforced so as to have greater resistance to being stretched along their lengths under the influence of the fluid pressure forces applied to the base 40 by the inflating air bag 14.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a reaction plate having a major upper side surface with a rectangular peripheral shape;

an inflator having a cylindrical housing projecting axially from said reaction plate;

an inflatable vehicle occupant protection device having an edge portion encircling said housing;

a cover for said protection device, said cover having a pair of generally parallel opposite side walls and a pair of mounting flaps projecting from said side walls in opposite directions over said rectangular upper side surface of said reaction plate; and a retainer holding said edge portion of said protection device, said mounting flaps, and said inflator against said reaction plate with an axially directed clamping force;

said mounting flaps and said reaction plate together defining a pair of tongue-and-groove joints which comprise means for interlocking said mounting flaps with said reaction plate, said tongue-and-groove joints having linear configurations parallel to said opposite side walls of said cover.

2. Apparatus as defined in claim 1 wherein said cover has a pair of secondary opposite side walls which are generally perpendicular to said tongue-and-groove joints, said secondary opposite side walls having thickened lower edge portions extending in said opposite directions alongside said mounting flaps.

3. Apparatus as defined in claim 1 wherein said mounting flaps have upper and lower sides which are planar and parallel, said tongue-and-groove joints comprising tongues defined by ridge portions of said mounting flaps which project from said lower sides downward into grooves defined by said reaction plate.

* * * * *